United States Patent [19]

Lim et al.

[11] Patent Number: 4,966,575

[45] Date of Patent: Oct. 30, 1990

[54] AUTOMATIC STEPLESS TRANSMISSION APPARATUS AND METHOD THEREOF

[76] Inventors: Jun Y. Lim, Duckjong Villa Ka-204, Duckjong-Ri Hoecheon-Eup, Yangju-Kun, Kyungki-do; Jong O. Na, 24-1,265-154, Bokwang-Dong, Yongsan-ku, Seoul, both of Rep. of Korea

[21] Appl. No.: 347,916

[22] Filed: May 5, 1989

[30] Foreign Application Priority Data

Sep. 13, 1988 [KR] Rep. of Korea .............. 11782/88[U]

[51] Int. Cl.$^5$ .......................... F16H 3/74; F16H 3/62
[52] U.S. Cl. ....................... 475/257; 475/323
[58] Field of Search ............ 74/752 B, 751, 682, 74/762, 763, 766, 767, 752 R; 475/257, 323

[56] References Cited

U.S. PATENT DOCUMENTS

| | | | |
|---|---|---|---|
| 2,234,384 | 3/1941 | Ryan | 74/752 B |
| 3,722,326 | 3/1973 | Dorma | 74/752 B |
| 4,334,440 | 6/1982 | Fonck | 74/751 X |
| 4,559,848 | 12/1985 | Kerr | 74/750 R |
| 4,598,610 | 7/1986 | Kim | 74/752 BX |

*Primary Examiner*—Dwight Diehl
*Attorney, Agent, or Firm*—Low and Low

[57] ABSTRACT

An apparatus and method for automatic adjustment of the variation ratio for distributing an input rotational force into a low speed power line having high variation ratio, and for combining the two power lines thereby providing an output with stepless variation is disclosed.

11 Claims, 14 Drawing Sheets

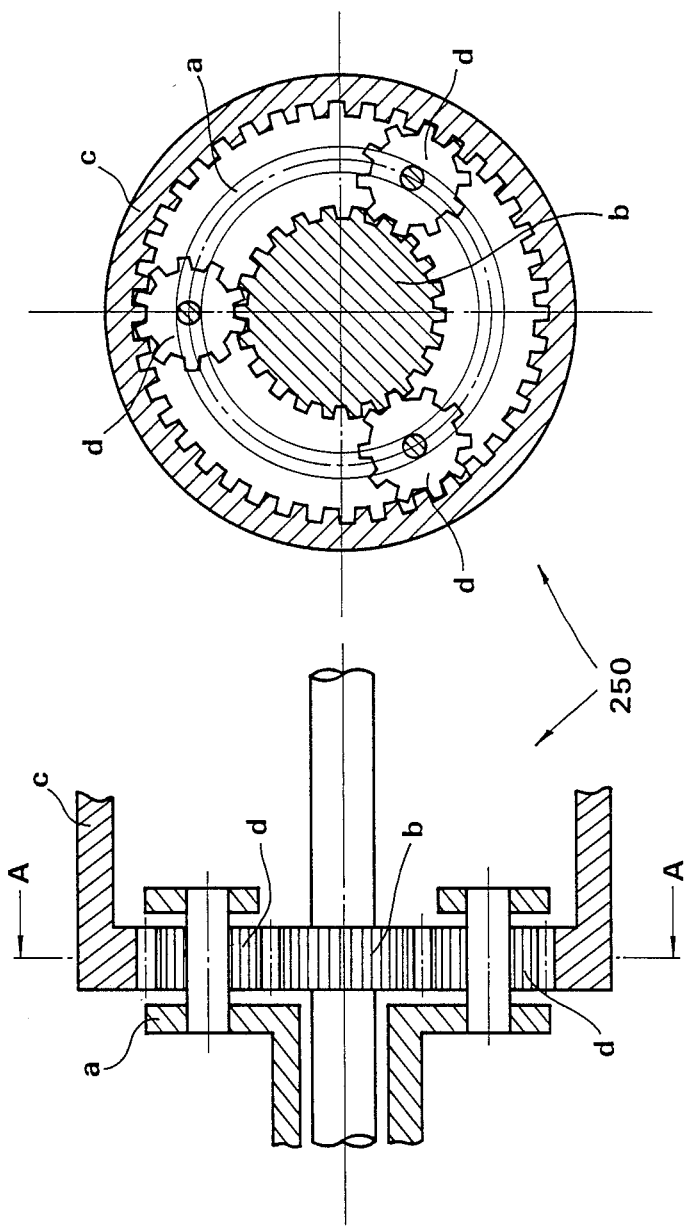

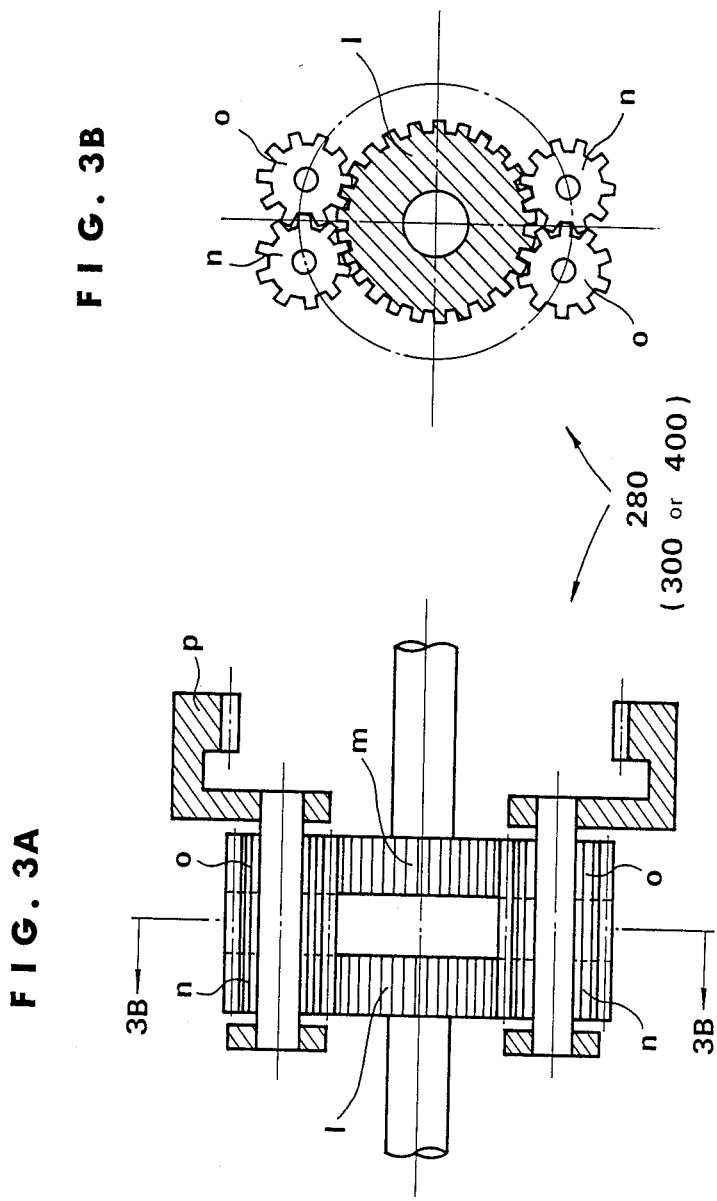

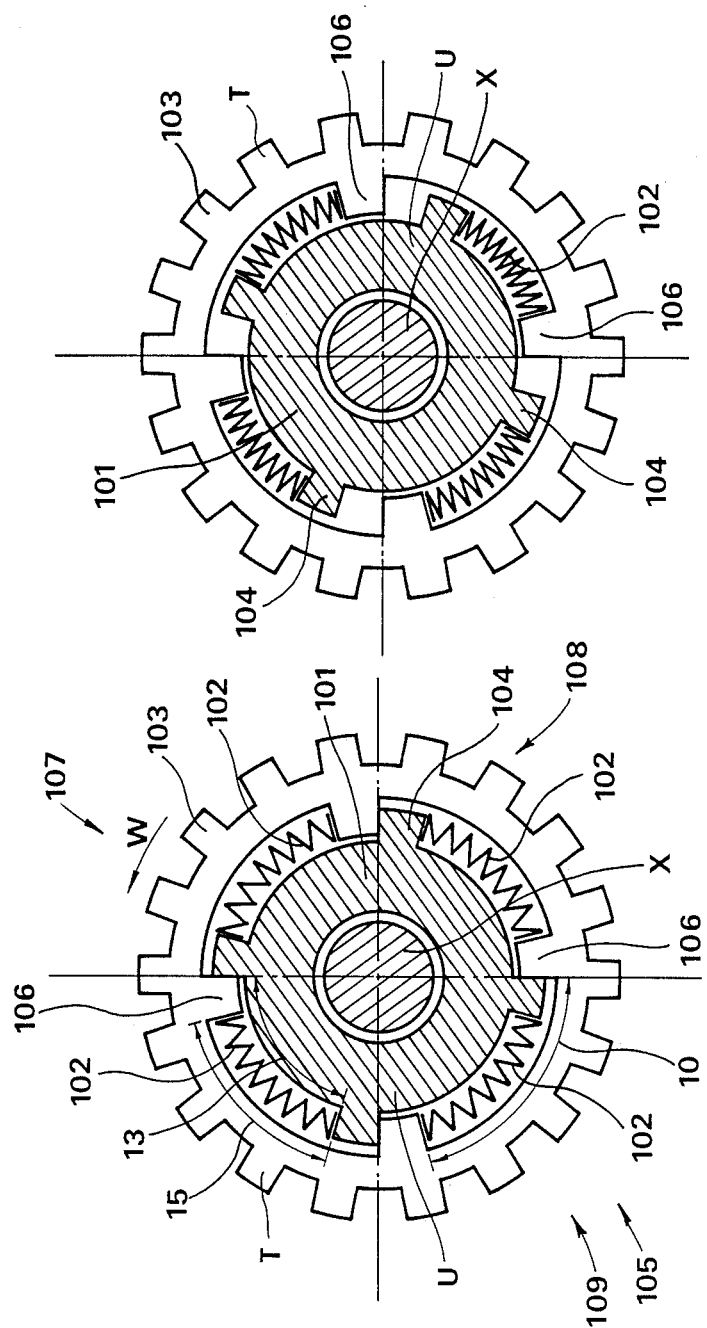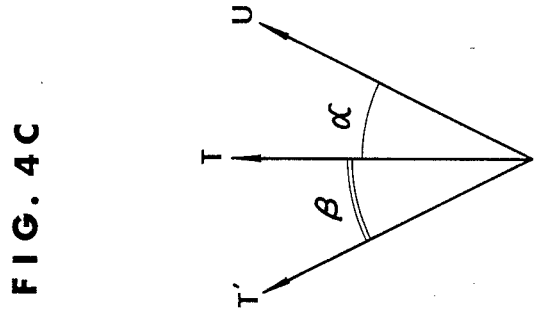

AUTOMATIC STEPLESS TRANSMISSION APPARATUS AND METHOD THEREOF

FIELD OF THE INVENTION

This invention relates to an automatic transmission and more particularly, to an automatic and stepless change in the rotational speed of an output in response to a change in the load of the output shaft and to a change in the rotational input to the input shaft.

BACKGROUND AND SUMMARY OF THE INVENTION

This invention relates to an automatic stepless transmission apparatus and method, and particularly to such transmission and method which changes a rotational speed ratio of an output/input shaft automatically in response to the load of the output shaft and the rotational input of the input shaft without any clutch and removal or replacement of gear, and which can be utilized in any mechanical device requiring the change of gears between a prime mover and load.

The method of the invention can be described as a method of automatic adjustment of a variation ratio for distributing the input rotational force into a low speed power line having low variation ratio and a high speed power line having high variation ratio, and for combining the two power lines again to allow stepless variation. The method is characterized in that the rotational force of the low speed power line is brought into balance with the rotational force of the high speed power line by applying rotational resistance which impedes the rotational force of the low speed power line. The rotational resistance varies according to the phase between the input shaft and the output shaft of the load detecting gear set. The rotational resistance applied to the low speed power line is decreased upon an increase of the load or a decrease of the input power and increased upon decrease of the load or increase of the input power, such that the variation ratio is automatically adjusted depending on condition of the input and the load.

A rotational force adjusting device which utilizes a differential gear assembly, having a sun gear, a planetary gear, a ring gear and a planetary gear carrier, is characterized in that a lever is provided around the planetary gear carrier. The position of the lever is set by a position setting means, including a spring, such that the spring force is applied both to the sun gear 704 and to the ring gear 705 which are under rotation.

The prior art described in U.S. Pat. No. 4,598,610 discloses a complicated device which is of little practical use due to its uncertainty in automatic control and power transmission.

Therefore, it is an object of this invention to solve the problems of the prior art devices and to provide an improved automatic stepless transmission apparatus which is not complicated as those in the prior art and which has reliable speed control operation, efficient power transmission and rapid action against variation of load.

It is another object of this invention to provide an improved method for transmitting rotational power steplessly with a gear assembly, and automatically in response to variation of load.

It is another object of this invention to provide a rotational force adjusting device which imposes a rotational resistance on a sun gear rotating at one speed and which adds a rotational force of almost the same magnitude as the rotational resistance imposed on the sun gear, to the ring gear rotating in a direction opposite to the sun gear.

BRIEF DESCRIPTION OF THE DRAWINGS

FIGS. 2A and 2B are sectional views of the differential gear assembly;

FIG. 3A is a sectional view of the accelerating gear assembly and the reduction gear assembly;

FIG. 3B is a sectional view taken alone line 3B—3B of FIG. 3A;

FIGS. 4A and 4B show sectional views of the load detecting gear set;

FIG. 4C illustrates a vector diagram of the input and the output;

FIG. 7A shows a part of a section taken along line B—B of FIG. 5 and FIG. 7B shows a part of a section taken along line C—C of FIG. 5;

DESCRIPTION OF THE INVENTION

Figure 1:
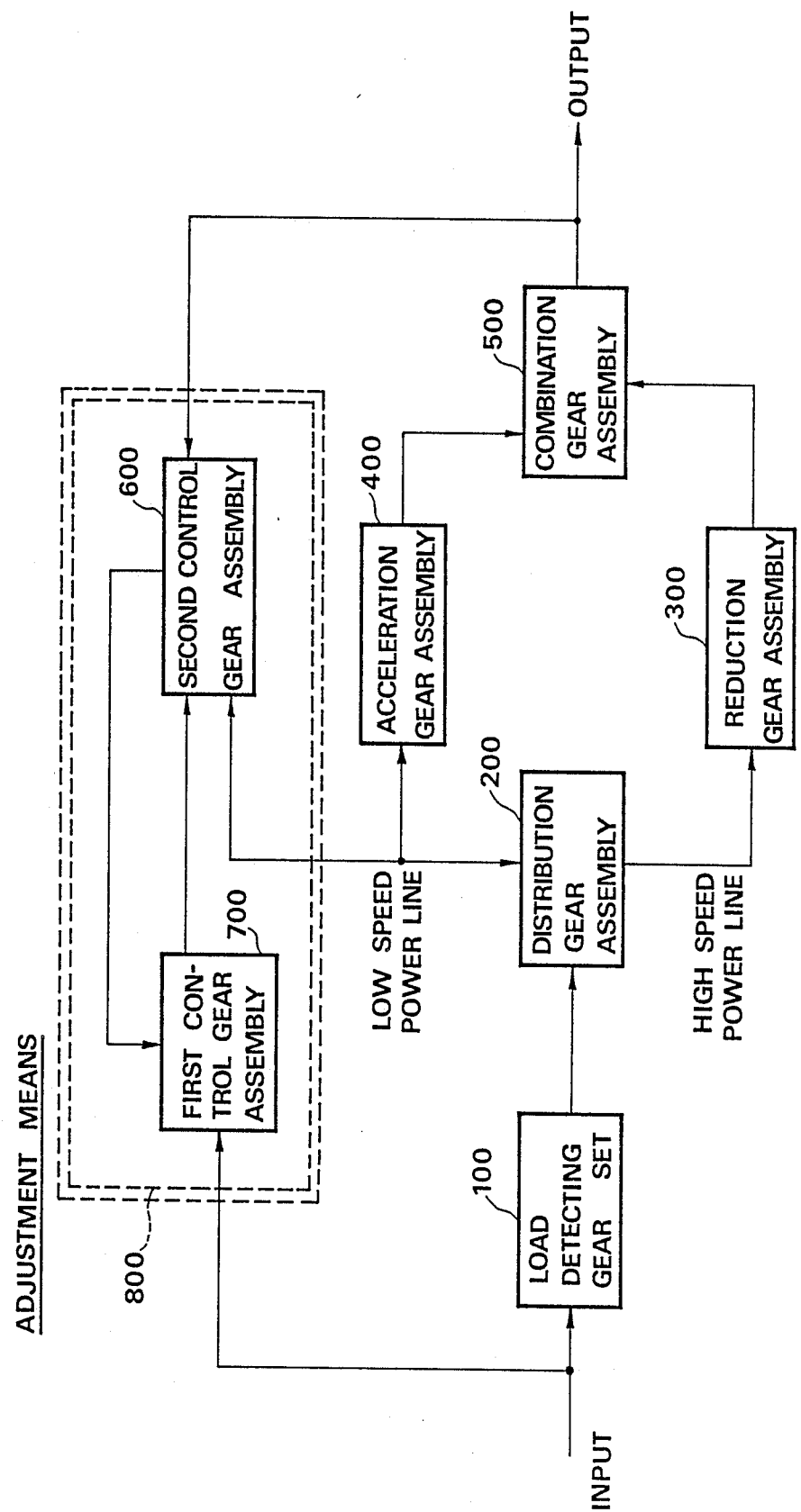
FIG. 1 is of the present invention.

FIG. 1 shows a block diagram of the present invention. As shown in FIG. 1, the input(rotational force) is transmitted to distribution gear assembly 200 through load detecting gear set 100, then the distribution gear assembly 200 distributes the rotational force into high speed power line 12 and low speed power line 14, with the high speed power line being connected to reduction gear assembly 300 while the low speed power line being connected to acceleration gear assembly 400, and the rotational forces of the two power lines are combined at combining gear assembly 500 and transmitted to the output shaft 501.

Rotational adjustment means 800 consists of a first control gear assembly 700 and a second control gear assembly 800 and detects the difference in phase between input shaft and output shaft, thus controlling the rotational forces of both the high speed power line and low speed power line, thereby automatically adjusting the revolutions of output shaft.

Figure 5:
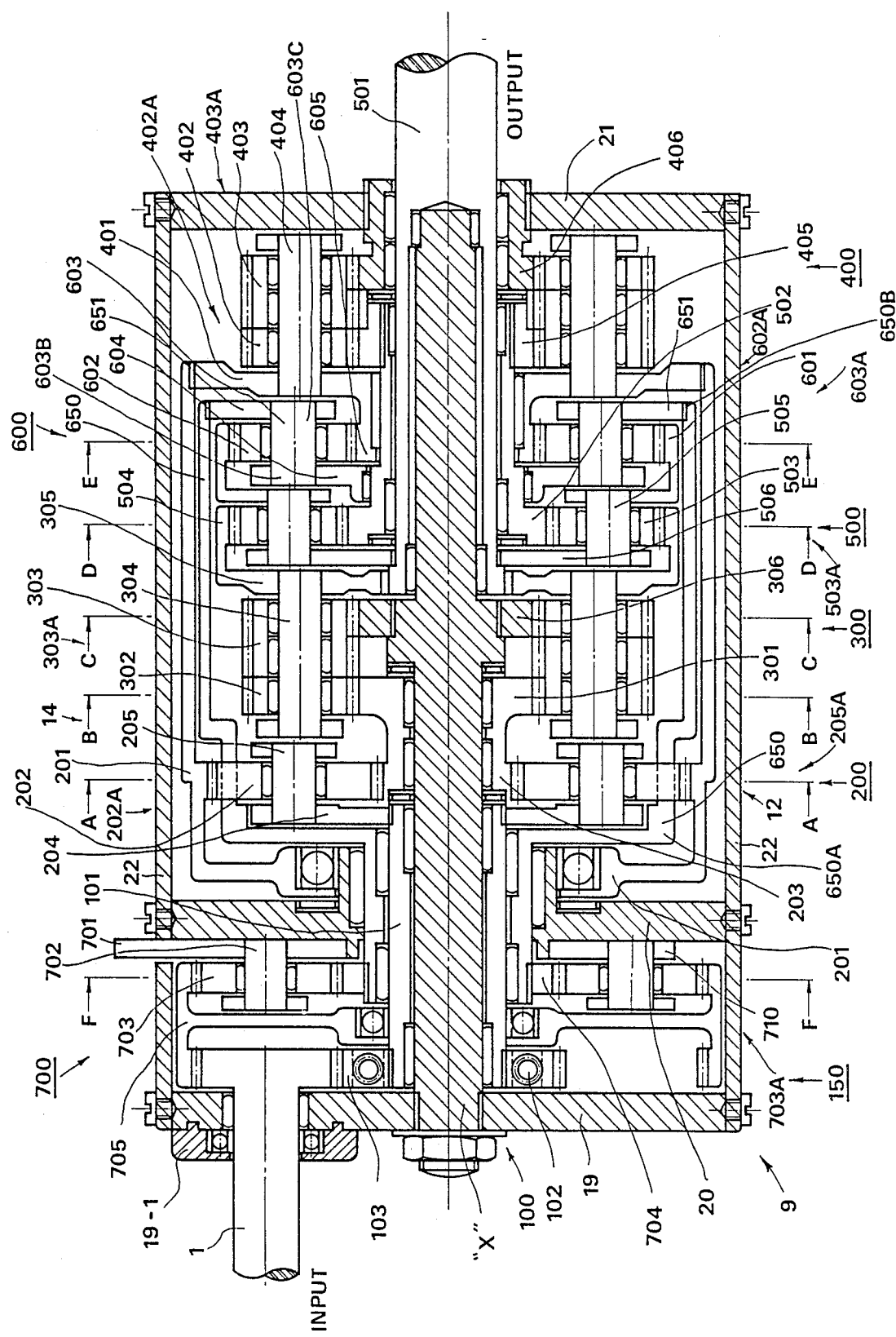
FIG. 5 is a sectional view of the automatic stepless transmission equipment taken along its axis.

This invention is an automatic stepless transmission apparatus 9 FIG. 5. which comprises: distributing means 200 for distributing the input rotational force from rotational shaft 101 into a high speed power line transmitting a high gear variation ratio and a low speed power line transmitting a low gear variation ratio. An adjusting means 800 and combination means 500 is utilized for adjusting and combining the rotational forces of both the high speed power line (H.S.P.L) and low speed power line (L.S.P.L.) according to the load and input condition. A load detecting gear set 100 is connected to an input shaft 1 for detecting the change in rotational phase which varys with the magnitude of the rotational force imposed on the input shaft and the load imposed on the output shaft 501. A distribution gear assembly 200 is utilized for distributing the rotational force passed through the load detecting gear set 100 into a high speed power line and a low speed power line. A reduction gear assembly 300 is utilized for reducing the rotational force of the high speed power line. An acceleration gear assembly 400 is utilized for accelerating the rotational force of the low speed power line. A combination gear assembly 500 is utilized for combining and transmitting to the output shaft the reduced rotational force of the high speed power line and the accelerated rotational force of the low speed power line. A rotational force adjustment means 800 is connected to output shaft, input shaft and low speed power line, for automatically adjusting the variation ratio in compliance with the condition of input and load by means of balancing the rotational forces of the high speed power line and the low speed power line, whereby a steplessly varying and transmitting to the output of shaft of the rotational force from zero to a predetermined ratio is achieved.

The invention also relates to a method of automatic adjustment of variation ratio for distributing an input rotational force into a low speed power line having a low variation ratio and into a high speed power line having a high variation ratio, and for combining the two power lines again to allow stepless variation.

The method comprises bringing the rotational force of the low speed power line into balance with the rotational force of the high speed power line by applying rotational resistance which impedes the rotational force of the low speed power line. The rotational resistance directed to the low speed power line according to the phase between the input shaft and the output shaft of the load detecting gear set is varied. The rotational resistance upon an increase in the load or a decrease in the input power is decreased. The rotational resistance is increased upon a decrease in the load or an increase of the input power, such that the variation ratio is automatically adjusted depending on condition of the input and the load. Preferably, the apparatus 9 of the invention accomplishes the above described method.

Differential gear assembly 250 used in this invention is as shown in FIGS. 2A and 2B. FIG. 2B is a section taken along line A—A of FIGS. 2A. The distribution gear assembly 200, the first control assembly 700, the second control assembly 600, the combination gear assembly 500, are collectively described as a differential gear assembly 250. These assemblies are mechanically the same but functionally different. Thus, a description of the mechanical components of one describes the other. It is a gear assembly consisting of a sun gear b mounted on center, a ring gear c provided on the periphery and three planetary gears d placed between the sun gear and the ring gear and combined with a carrier a.

When the carrier a is rotated by input, the ring gear c and the sun gear b, provided they have no load or resistance, rotate in the same direction and with the same revolutions as the carrier a.

However, if either the ring gear c or the sun gear b is imposed by more load or resistance, it rotates with decreased revolutions, and vice versa.

Representing the number of teeth of each gear in the differential gear assembly 250 by symbol, number of teeth of gear b by "Tb" and that of gear c by "Tc", the relationship between rotations is given as follows.

$a$: fixed, $b$: input, $c$: output          1.

$$\text{revolutions of } "c" = \frac{Tb}{Tc} \times \text{Input Rev.}$$

$a$: fixed, $c$: input, $b$: output          2.

$$\text{revolutions of } "b" = \frac{Tc}{Tb} \times \text{Input Rev.}$$

$b$: fixed, $a$: input, $c$: output          3.

$$\text{revolutions of } "c" = \frac{Tb + Tc}{Tc} \times \text{Input Rev.}$$

$b$: fixed, $c$: input, $a$: output          4.

$$\text{revolutions of } "a" = \frac{Tc}{Tb + Tc} \times \text{Input Rev.}$$

$c$: fixed, $a$: input, $b$: output          5.

$$\text{revolutions of } "b" = \frac{Tb + Tc}{Tb} \times \text{Input Rev.}$$

$c$: fixed, $b$: input, $a$: output          6.

$$\text{revolutions of } "a" = \frac{Tb}{Tb + Tc} \times \text{Input Rev.}$$

Hereto relationships of revolutions in differential gear assembly is given for various cases.

The acceleration gear assembly 400 and the reduction gear assembly 300 comprise the adjustment gear assembly 280. The acceleration 400 and reduction 300 gear assembles are mechanically the same, i.e. comprise the same components, but are functionally different. Thus, a description of the mechanical components of one describes the other.

Figure 3C:
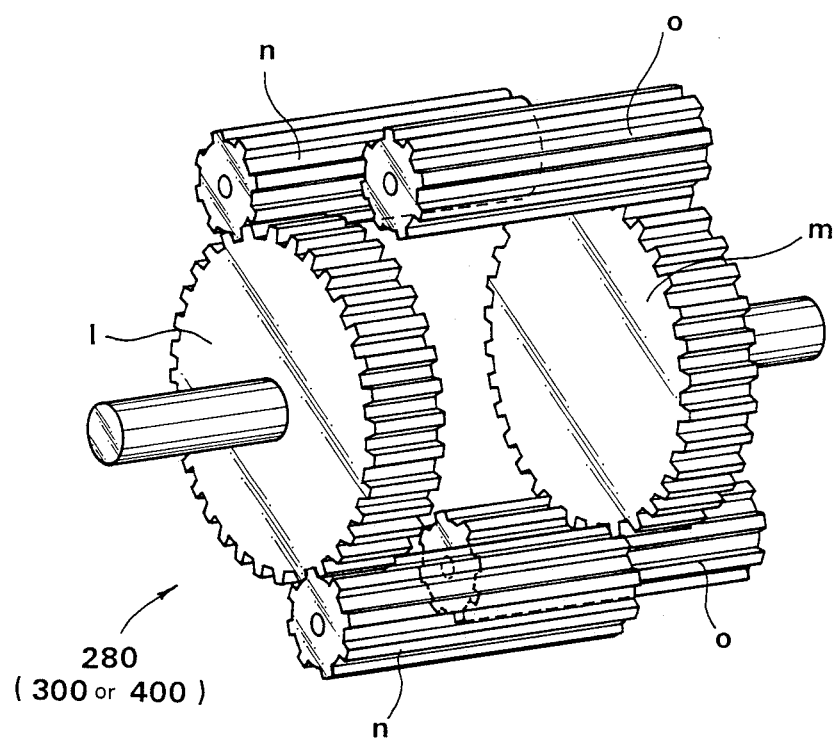
FIG. 3C is a perspective view of FIG. 3A.

Acceleration gear assembly 400 and reduction gear assembly 300 used in the present invention, as shown in FIGS. 3A and 3B, have two sun gears "l,m" with a planetary gear "n" arranged on a sun gear "l" and with the other planetary gear "o" engaged with the planetary gear "n" to be a pair, while the sun gear "m" being engaged with the gear "o". Furthermore, both of the planetary gears "n,o" are combined with a planetary gear carrier "p" so as to revolve according to revolution of carrier and to rotate in engagement with the other planetary gear of the pair. As this adjustment gear is used having one of the sun gears "l,m" fixed, a description of the revolution ratio is given only for a condition in which one of the sun gears is fixed. An example is given for a case in which the gears "n,o" have the same number of teeth, and the gears "l,m" have the same number of teeth.

1. m: fixed, l: input, p: output

Planetary gear carrier "p" performs ½ revolutions with the same rotational direction as sun gear "1" when sun gear "1" performs 1 revolution.

2 m: fixed, p: input, l: output

Sun gear "1" performs 2 revolutions with the same rotational direction as the carrier "p" when the carrier "p" performs 1 revolution.

As described above, this adjustment gear assembly 280 is able to accelerate the speed to 2 times or decrease to ½ times in revolution ratio. Accordingly, for convenience, this adjustment gear assembly 280 is referred to as acceleration gear assembly 400 when used to accelerate the speed, and it is referred to as reduction gear assembly 300 when used to decrease the speed.

An electric engine, gasoline motor, and the like, provides rotational power to the input shaft 1 which in turn provides rotational power to the load detecting gear 103. Preferably, the load detecting gear 103 includes a plurality of projections 107 positioned thereon with an arc space 10 separating adjacent positioned projections. Preferably, the projections 108 extend inwardly relative to the center of the gear 103 as illustrated at FIGS. 4. The rotational shaft 101 includes a plurality of projections 108 positioned thereon in a manner to provide an arc space 13 separating adjacent projections to enable each arc space 10 of the load detecting gear 103 to receive the projections 104 of the rotational shaft 101 and to form a common arc space 15 comprising a portion of each arc space 10, 13 of gear 103 and the rotational shaft 101, respectively, to enable partial rotation of the gear about the rotational shaft. Preferably, each projections 104 extends outwardly relative to the center of the rotatable shaft 101 as illustrated at FIGS. 4A and 4B. A spring 102 is positioned in each alternate common arc space such that upon rotation in a counterclockwise direction "w" of the load detecting gear 103 the rotational force provided to the load detecting gear is transmitted through the projections of the load detecting gear to the springs 102 positioned in the common arc space and then to the projections 104 of the rotational shaft 101, as see FIGS. 4A and 4B.

Rotational shaft 101 also referred to as ("u") is drivingly connected to the planetary gear carrier 204 of distribution gear assembly 200. Rotation of gear 103 also refened to as ("t") in direction of "w", as shown, transmits the rotational force from the internal projections of gear 103 ("t") to projections on the rotational shaft 101 ("u") through the spring such that the rotational shaft 101 ("u") rotates in the same direction as the gear 103 ("t").

Load applied on the rotational shaft 101 ("u") acting against the rotational force of the gear 103 ("t") produces difference in phase (phase angle) between the gear 103 ("t") and the rotational shaft 101 ("u"). This relationship is illustrated a FIG. 4C.

The difference in phase is caused by the compression of springs 102 resisting the torque load and is varied with the magnitude of the torque load. This phase angle varies with the interrelation of the driving force of the prime mover shaft and the torque load. The phase angle increases upon an increase of the driving rotational force of prime mover shaft to rotational force of gear 103 ("t") under conditions of uniform load and uniform revolutions(state of pre-existing equilibrium). The phase angle also increases upon an increase in the load under conditions of uniform load and uniform revolutions (state of pre-existing equilibium).

Representing driving force of uniform revolutions by "T" and the torque load by ("U") and putting into illustration, it is readily recognized that "T" and "U" come into stabilization under uniform rotational velocity producing the phase angle $\alpha$. If the driving force of prime mover shaft increases under a stabilized condition, "T'" leads "T" by the phase angle $\beta$ from the stabilized condition.

Figure 6:
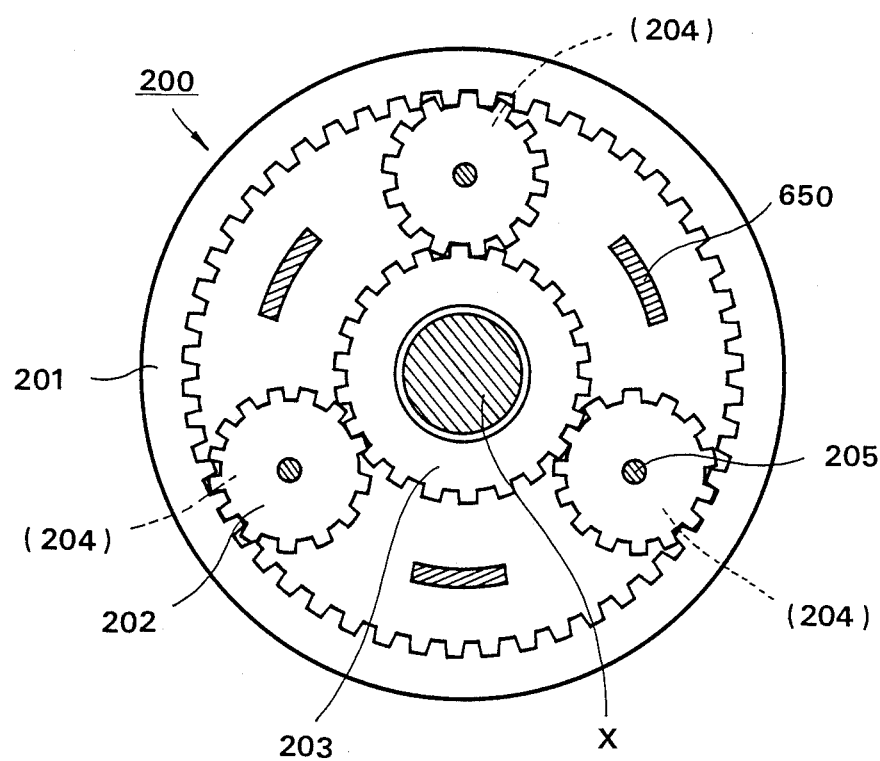
FIG. 6 is a sectional view of the distributing gear assembly taken along line A—A of FIG. 5.

The section of distribution gear assembly 200 is shown in FIGS. 5 and 6. The distribution gear assembly 200 is structurally similar to the illustration of the differential gear assembly 250 in FIGS. 2A and 2B. That is, the planetary gears d are mounted between the ring gear c and the sun gear b as illustrated in FIGS. 2A and 2B.

The planetary gear carrier 204 a of distribution gear assembly 200 is combined with the rotational shaft 101 ("u") of the load detecting gear set 100 by means of a spline such that they rotate together simultaneously, for the sake of clarity the splines are not illustrated in the Figures. Rotation of planetary gear carrier 204 causes the ring gear 201 and the sun gear 203 to rotate. The ring gear 201 is combined with the planetary gear carrier 401 of the acceleration gear assembly 400, and the sun gear 203 is integrally combined with the sun gear 301 of reduction gear assembly 300.

Figure 7:
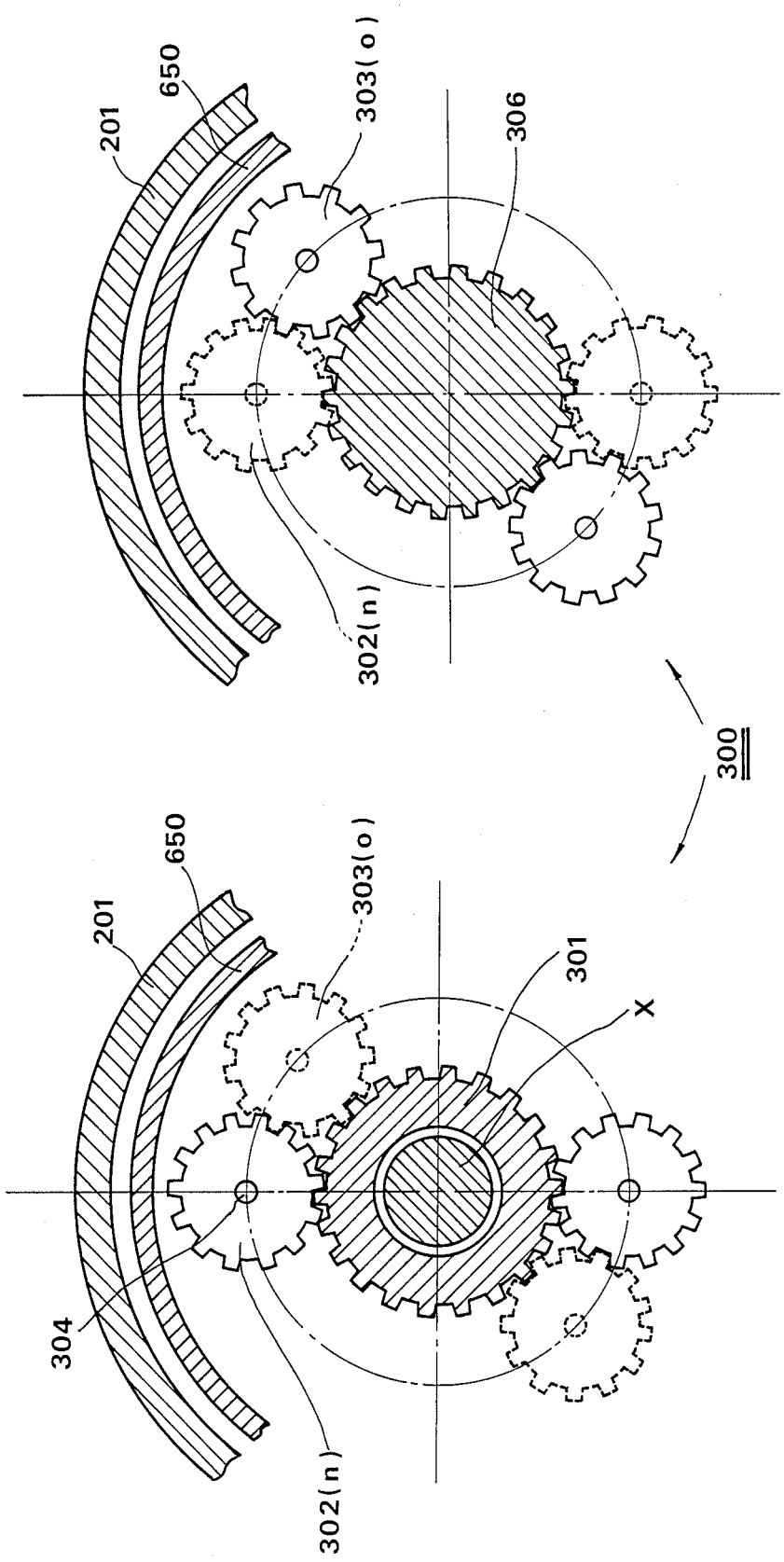
FIGS. 7A and 7B are sectional views of the reduction gear assembly, where

The reduction gear assembly 300 is shown in FIGS. 5, 7A and 7B, a general construction of it is shown in FIGS. 3A and 3B, and a description of it is set forth above. The sun gear 301 of reduction gear assembly 300 is integrally combined with the sun gear 203 of distribution gear assembly 200 to receive the transmitted power and in turn transmit this power to the planetary gear 302. The planetary gear 302 is engaged with planetary gear 303 which in turn is engaged with the sun gear 306 connected to the fixed shaft "x" by means of a spline. Therefore, rotation of the sun gear 301, which is rotatably mounted on shaft "x", drives the planetary gear carrier 305, to which two planetary gears 302, 303 are combined through their respective pin 304.

Figure 8:
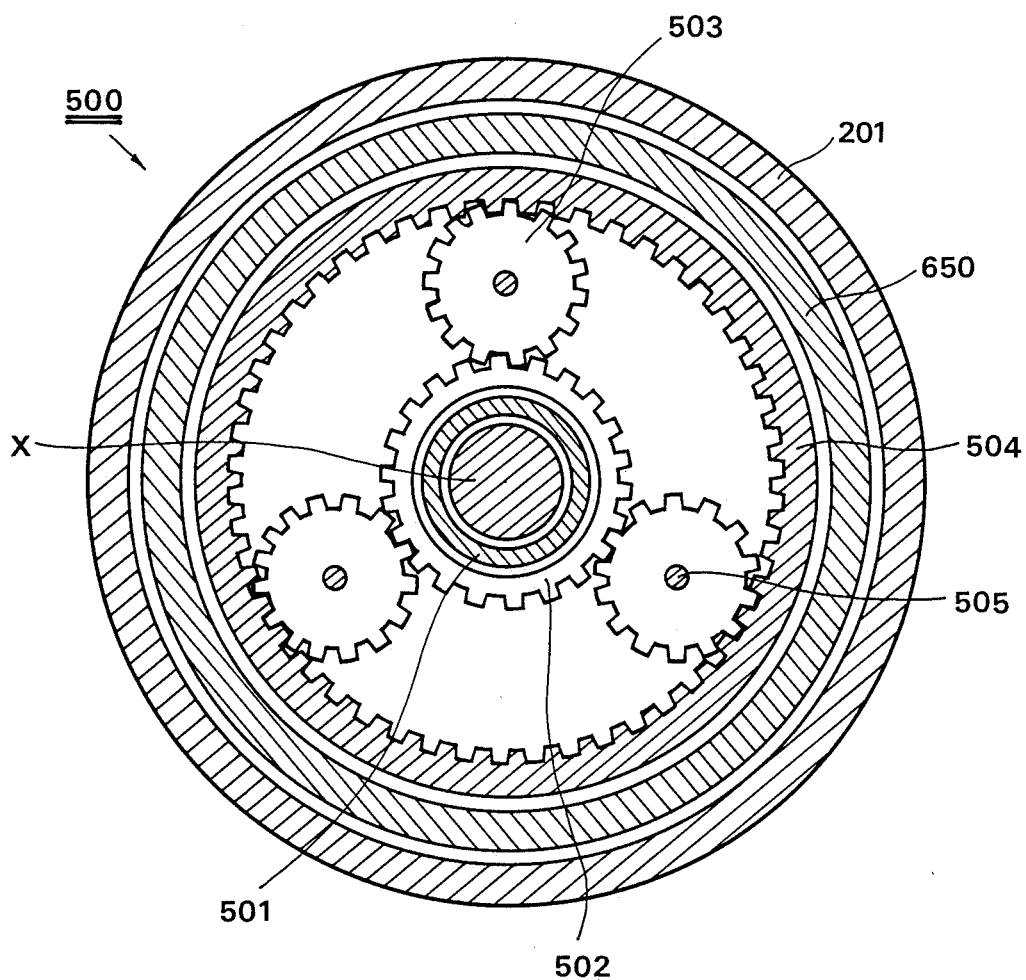
FIG. 8 is a sectional view of the combination gear assembly taken along line D—D of FIG. 5.
Figure 9:
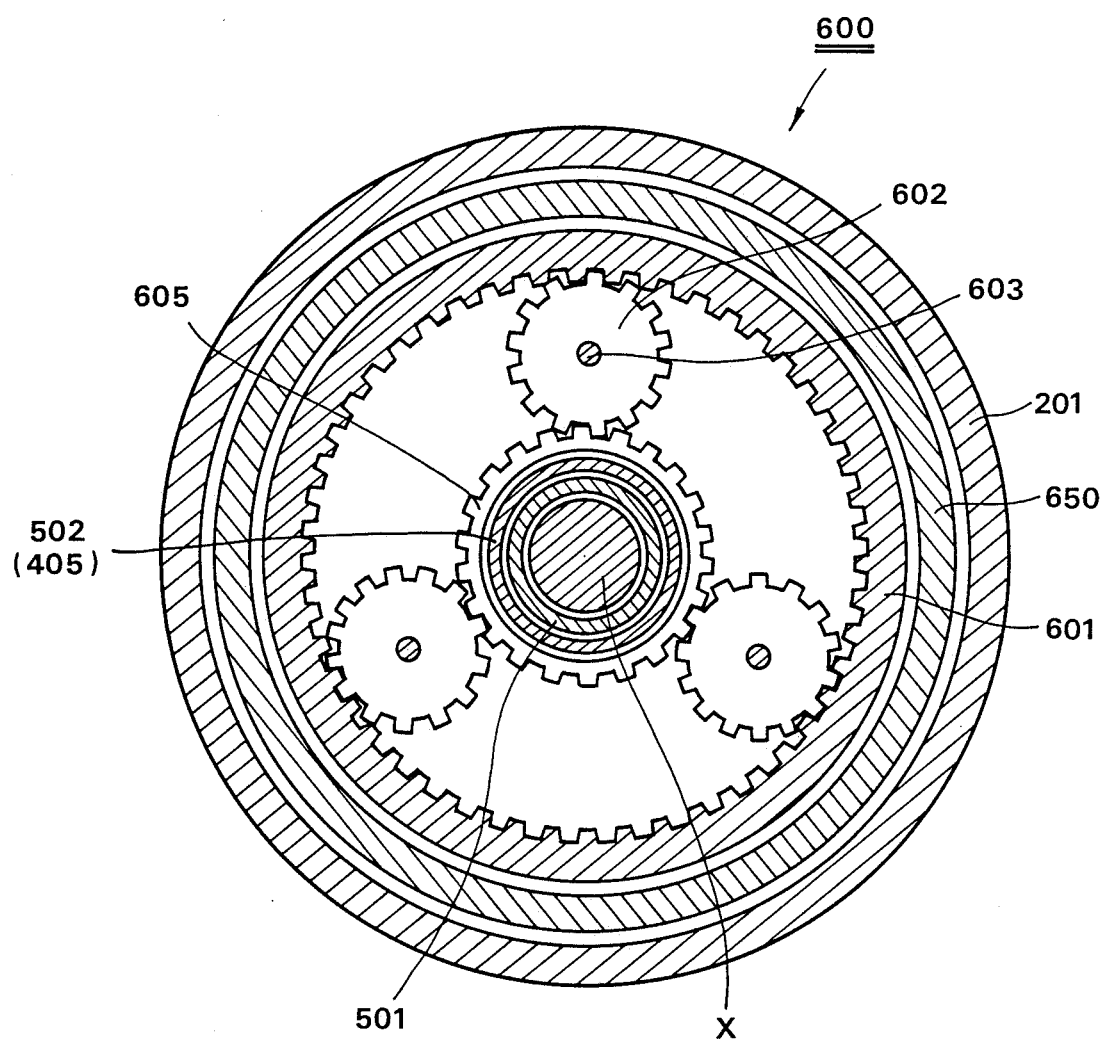
FIG. 9 a sectional view of the second control gear assembly taken along line E—E of FIG. 5.
Figure 10:
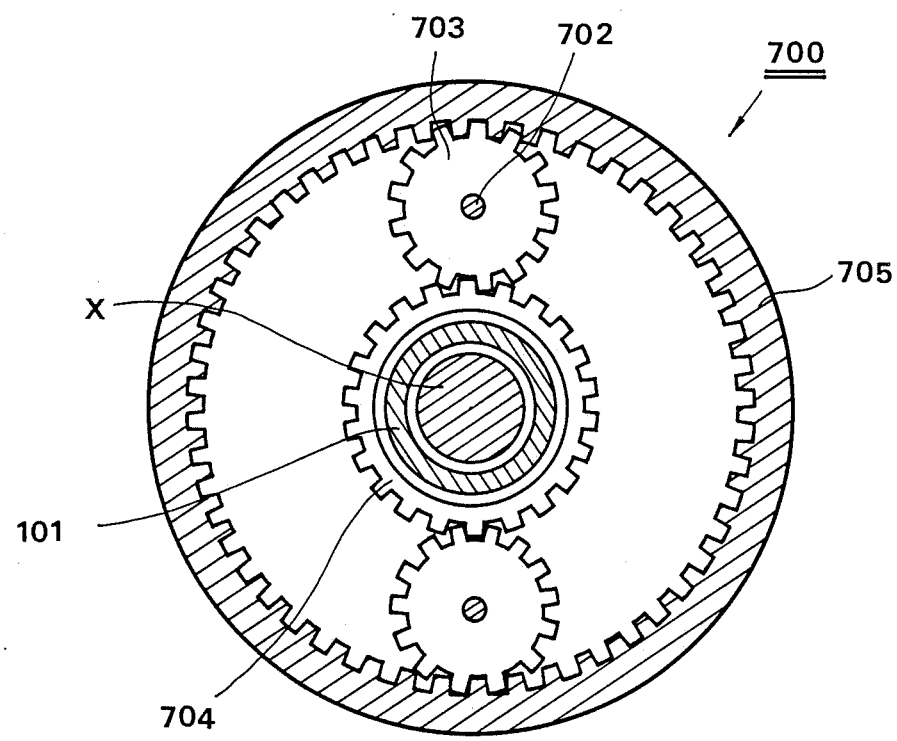
FIG. 10 is a sectional view of the first control gear assembly taken along line F—F of FIG. 5.

The acceleration gear assembly 400 has the same structure as that of the reduction gear assembly 300, the section of it being shown in FIG. 5. The sun gear 406 of the acceleration gear assembly is combined to the casing 21 by means of a spline so as not to rotate. The planetary gear 403 which is engaged with the sun gear 406 is also engaged with other planetary gear 402. The carrier 401 of these planetary gears 402, 403, are combined with the ring gear 201 of the distribution gear assembly 200 by means of a spline to rotate as an integral body. The sun gear 405 is engaged with the planetary gear 402 to receive rotational force from planetary gear 402. At the same time sun gear 405 is combined with the sun gear 502 of the combination gear assembly 500 by means of a spline to transmit the power to it. The section of the combination gear assembly 500 is shown in FIGS. 5 and FIG. 8. The ring gear 504 of the combination gear assembly 500 is integrally combined with the planetary gear carrier 305 of the reduction gear set, and the sun gear 502 of the combination gear assembly is combined with the sun gear 405 of the acceleration gear assembly by means of a spline to anable simultaneous rotation. The planetary gear carrier 506 of the combination gear assembly 500 is combined with output shaft 501 by means of a spline to transmit the rotational forces, from the ring gear 504 and the sun gear 502, which is transmitted along the low speed power line and the high speed power line, to output shaft 501.

The adjustment means 800 consists of the first control gear assembly 700 and the second control gear assembly 600 as shown in FIG. 5.

The second control gear assembly 600 consists of the ring gear 601, the planetary gear 602, the planetary gear pin 603, the planetary gear carrier 604, the sun gear 605 and the adjustment shaft 650 which is a connecting part to the first control gear assembly 700 the general construction of it is same as that of the differential gear assembly 200 aforementioned.

In the same manner, the first control gear assembly 700 is the same structure of the differential gear assembly 200 and consists of the lever 701, the planetary gear 703, the planetary gear pin 702 to rotatably secure each planetary gear to the planetary gear carrier, the sun gear 704 and the ring gear 705. The lever 701 being integrally combined with the planetary gear carrier 710, and the number of teeth of the planetary gear 703 being determined in such a way that the carrier 710 does not rotate and remains stationary and the uppermost end of the lever emerging to outside of the casing 19, 19-1, 21, 22 of the transmission.

FIG. 5 is a sectional view with the upper part and the lower part of the automatic stepless transmission apparatus cut in appropriate angles with reference to the shaft as a basis. The detailed explanation of operation of the invention is given with reference to the drawings. Rotation of the input shaft 1 drives the rotational shaft 101, ("u"), through the outer gear 103, ("t") in FIGS. 4A and 4B and spring 102 of the load detecting gear set. The planetary gear carrier 204 of the distribution gear assembly 200 combined with the rotational shaft 101 by means of a spline. The carrier 204 is rotated by the rotational shaft 101 causing the ring gear 201 and the sun gear 203 to rotate. Consequently the rotational force, which is put into input shaft 1, is distributed into high speed power line and low speed power line. The ring gear 201 for low speed power line and the sun gear 203 for high speed power line rotate in such a way that when low speed power line undergoes larger rotational resistance, or more load, the sun gear 203 for high speed power line increases in rotation and when high speed power line undergoes larger rotational resistance, the ring gear 201 for low speed power line increases in rotation.

The reference to the "low speed power line" and the "high speed power line" as such is because the revolutions of the output shaft 501 per a revolution of the carrier 204 is greater when the ring gear 201 is stationary than when the sun gear 203 is stationary, and accordingly, for convenience, the line to which the sun gear 203 belongs is referred to as high speed power line 12 and similarly the line to which the ring gear 201 belongs as low speed power line 14. The sun gear 203 of high speed power line rotates as an integrated body with the sun gear 301 of reduction gear assembly 300 and because the sun gear 306 of reduction gear assembly is combined with the fixed shaft by means of a spline so as not to rotate, the rotational force put into the sun gear 301 is transmitted to the ring gear 504 of combination gear assembly 500 through the planetary gear 302 and the other planetary gear 303 and the planetary gear carrier 305.

The ring gear 201 of low speed power line is combined with the planetary gear carrier 401 of the acceleration gear assembly 400 by means of a spline while the opposite end of it is rotatably combined to the casing 20 of the equipment through bearing as illustrated at FIG. 5. The ring gear 201 receives a rotational force from the planetary gear 202 of distribution gear assembly and in turn transmits rotational force to the planetary gear carrier 401 of acceleration gear assembly. Because the sun gear 406 of acceleration gear assembly 400 is secured to the casing 21 of the equipment by means of a spline to prevent rotation, the rotational force which is transmitted to the planetary gear carrier 401 is transmitted to the sun gear 502 through the planetary gear 403, the other planetary gear 402 and the sun gear 405.

The combination gear assembly 500 receives the low speed power line rotational force from the sun gear 502 and the high speed power line rotational force from the ring gear 504 causing the planetary gear carrier 506 to rotate and finally transmit the input rotational force to the output shaft combined with the carrier 506.

Figure 13:
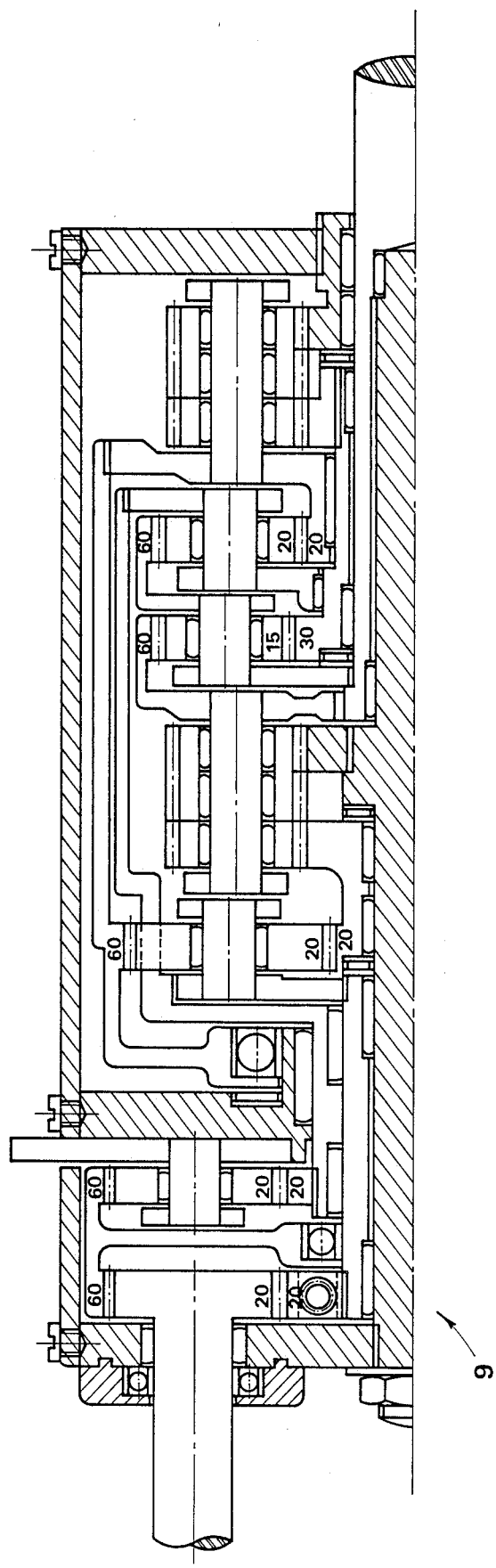
FIG. 13 is a partial sectional view of an embodiment of the present invention with the number of teeth of the gears noted. This view is absent the bottom portion of the apparatus for sake of clarity since the number of teeth shown is the same in the absent portion per respective gears.

In the differential gear utilized in the present invention, the number of teeth of the ring gear, the planetary gear and the sun gear may be varied in accordance with purpose. So, they can be designed for many cases. One example is described hereafter, as in FIG. 13 and Table 1, with the specific numbers as follows. The ratio of the number of teeth of sun gear: planetary gear: ring gear, that is, the ratio of the number of teeth of the differential gear in the distribution gear assembly is 20:20:60=1:1:3, and that in the combination gear assembly is 30:15:60=2:1:4. Also, that in the differential gear assembly of the first control gear assembly is 20:20:60=1:1:3 and that in the differential gear assembly of the second control gear assembly is 20:20:60=1:1:3. The ratio of the number of teeth of load detecting gear combined with input shaft:input gear:ring gear is 20:20:60=1:1:3, while the ratio of number of teeth of the acceleration gear assembly is 2 and that of the reduction gear assembly is $\frac{1}{2}$. In this embodiment, as transmission is operating, the revolutions of each part are as follows. In the case where the ring gear of low speed power line is stationary (by load or by adjustment means), per 1 revolution of input shaft, the sun gear 203 of high speed power line rotates 60+20/20=4 revolutions, the carrier 305 of reduction gear assembly rotates 4×$\frac{1}{2}$=2 revolutions, and the out put shaft rotates 2×60/30+60=4/3 revolutions. In case where the sun gear 203 of high speed power line is stationary, per 1 revolution of input shaft, the ring gear 203 of low speed power line rotates 60+20/20=4/3 revolutions, the sun gear 405 of acceleration gear assembly rotates 4/3×2=8/3 revolutions, and the output shaft rotates 8/3×30/30+60=8/9 revolutions. As high speed power line rotates 4/3 revolutions and low speed power line rotates 8/9 revolutions, the ratio of revolutions, that is, the ratio of high speed to low speed is 4/3:8/9=1.5:1. For the revolutions of the output shaft to be zero, per 1 revolution of input shaft, the sun gear 203 of high speed power line shall rotate −8 revolutions, the ring gear 201 of low speed power line shall rotate 4 revolutions, the carrier 305 of high speed line shall rotate −4 revolutions and the sun gear 405 of low speed power line shall rotate 8 revolutions. In actual operation, when the loud varies, for example where an automobile travels up an incline or against a head wind, the high speed power line and low speed power line act complementarily with each other such that the greater the revolutions of low speed power line, the lesser the revolutions of output and on the contrary, the greater the revolutions of high speed power line, the greater the revolutions of output.

By such operations of this invention, the transmission adapts to the load condition automatically and an automatic stepless transmission is be achieved.

The operation of the rotational adjustment means 800 is described below The ring gear 601 of the second control gear assembly 600 rotates in the same way as the output shaft. The ring gear 601 rotates 4/3 revolutions if the input shaft rotates one revolution and the sun gear 605 is stationary in condition where the low speed power line is stationary. Therefore, the planetary gear carrier 604 and the adjustment shaft 650 rotate $4/3 \times 60/60 + 20 = 1$ revolution which is same as that of the planetary gear carrier 204 of the distribution gear assembly 200. If the high speed power line is stationary and input shaft rotates one revolution, the output shaft performs 8/9 revolutions, the sun gear 605 rotates in the same way as the ring gear 201 of low speed power line rotating $60 + 20/60 = 4/3$ revolutions, and the adjustment shaft 650 rotates $8/9 \times 60/60 + 20 + 4/3 \times 20/60 + 20 = 1$ revolution. And even if the output shaft is stationary, the ring gear of low speed power line rotates 4 revolutions, so the adjustment shaft 650 rotates $4 \times 20/60 + 20 = 1$ revolution. Therefore the adjustment shaft 650 always rotates in the same revolution as the planetary gear carrier 204. When determining the number of teeth on the gears, as in this embodiment, it shall be determined in such a way that the revolution of adjustment shaft always becomes the same as that of the input shaft 1. Adjustment shaft 650 shown in FIG. 5 rotates in the same revolution as that of the planetary gear carrier 204 of the distribution gear assembly so that it can be arranged to penetrate the planetary gear carrier 204 as shown in FIG. 6. This adjustment shaft penetrates the planetary gear carrier 204 to lead to the first control gear assembly 700 and makes the sun gear 704 of the first control gear assembly to rotate with the same speed as the input side of load detecting gear 103. The sun gear 704 of the first control gear assembly 700 rotates with the same speed and in the same direction as the load detecting gear 103. The ring gear 705 is engaged with the input shaft gear 1 and the planetary gear 703. Those gears, both part of the ring gears 705, the load detecting gear 103 and the sun gear 704, and, the planetary gear 703 and the input shaft gear 1, have the same number of teeth and rotate in the same direction and with the same speed, so that the ever 701 of the planetary gear carrier of the first control gear assembly is in stationary condition without rotation.

Figure 11:
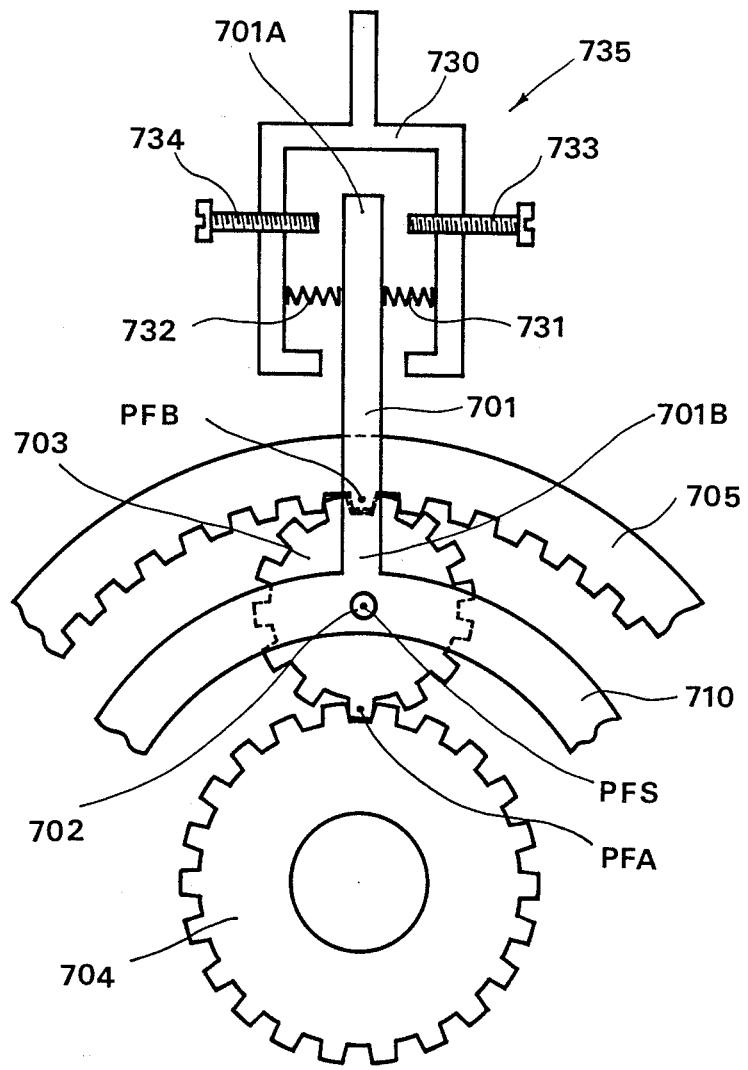
FIG. 11 is a schematic illustration of the first control gear assembly.
Figure 12A:
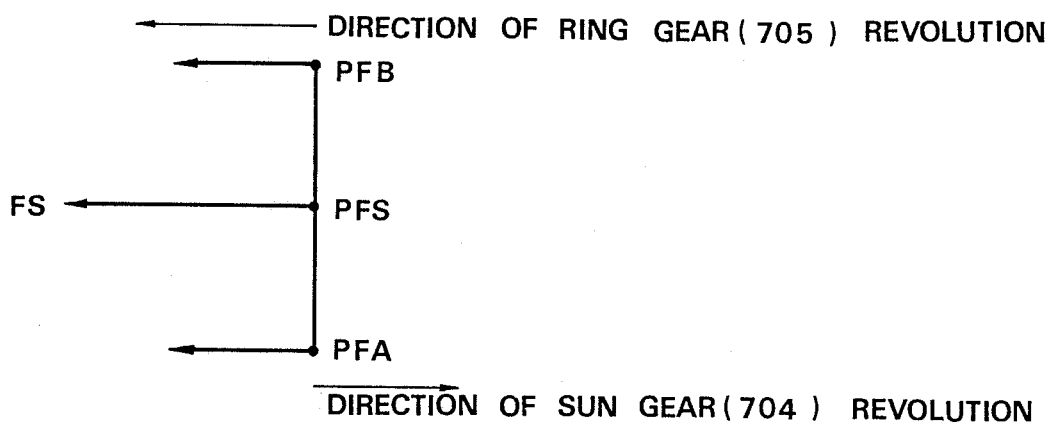
FIGS. 12A and 12B illustrate a description of the operation of the adjustment means.

The operation of the lever is described in detail below. This lever is, as shown in FIG. 11, designed to be always subjected to the force of the springs 731, 732 in either clockwise or counterclockwise direction This spring force is intended to push the lever in either clockwise or a counterclockwise direction and the ring gear 705 and the sun gear 704 rotate in the opposite direction to each other. The position of the setting means of lever 701 position is determined in such a way that the force of the springs 731, 732 exert on the lever 701 in the opposite direction to the rotational direction of the sun gear 704 when the load is imposed on the automatic stepless transmission apparatus provided by the present invention. Springs 731, 732 must be of sufficient strength to impose sufficient resistance on the sun gear so the rotational power of the L.S.P.L. can achieve rotational balance with the rotational power of the H.S.P.L. at the combination gear assembly. As shown in FIG. 12A, when the force of the spring 731 push the lever with the magnitude of force FS counterclockwise, this force applies on the point of PFS and then is transmitted to the planetary gear 703 which can rotate with the point of PFS as origin, and in turn a half of this force is transmitted to the points of PFA and PFB respectively. The components of this spring force are in the opposite direction to the rotational force of the sun gear 704 and in the same direction as the rotational direction of the ring gear 705, and eventually for the sun gear 704 act as the rotational resistance impeding the rotation of the sun gear 704 and for the ring gear 705 act the roll of assisting the ring gear 705 in the rotation as much as the force (approximately a half of the spring force) given from the sun gear 704.

And if the position of the setting means is determined in such a way that the spring force is in the direction to impede the rotation of the ring gear 705, the components of the spring force add the rotational resistance to the ring gear 705 and assist the sun gear 704 in the rotational force. Therefore, depending on the position of the lever 701, the force of a half of the spring force can be transfered from the ring gear 705 to the sun gear 704 with the rotational direction reversed.

This is a theoretical explanation only as to the operability of apparatus of the invention and the inventor does not hold it as being the only explanation as there may be others.

Figure 12B:
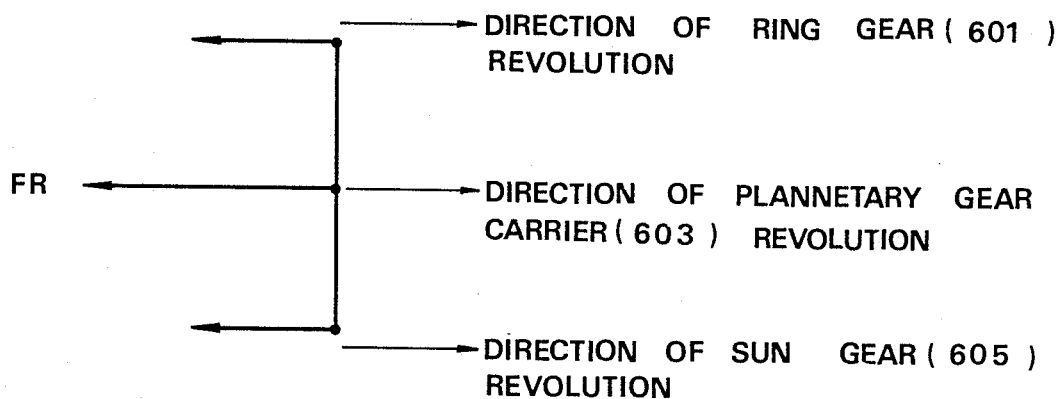

Looking into the operation of the planetary gear carrier 604 of the second control gear assembly 600, the planetary gear carrier 604 rotates in the same direction as that of the sun gear 605 and the ring gear 601. Depending on the position of the lever of the first control gear assembly 700, the rotational resistance imposed on the sun gear 704 acts in the direction of FR through the planetary gear pin 603 as shown in FIG. 12B so that the planetary gear carrier 604 is resisted with the impedance in rotation. The half of the force FR acts to impede the rotation of the output shaft and the other half acts to impede the rotation of the ring gear of the low speed power line. As described already, the ratio of revolution of the low speed power line to the high speed power line as calculated numerically in the embodiment is 1:1.5, which gives the ratio of the force acting on the load shaft of the low speed power line to the high speed power line at the combination gear assembly as 1.5:1 opposite to the ratio of revolution. Accordingly the force of low speed power line is stronger as 1.5 times of that of high speed power line, which makes the low speed power line rotate faster and eventually decreases the rotational speed of the output shaft. In this way it is impossible to increase the revolution of the output shaft, however, there is a force, which corresponds to the force acting on the sun gear 605 (impending the rotation of the sun gear 605) among the components of the force FR illustrated in FIG. 12B, and which brings about balance by equalizing the force of the low speed power line with the force of the high speed power line. This force impedes the rotation of the low speed power line and the magnitude of it is decided depending on setting of the position of the lever 701 of the first control gear assembly 700 so that through setting the lever in proper position the low speed power line is reduced in its rotational force so as to rotate in balance with the high speed power line. Therefore, the adjustment of magnitude of the force FR can increase or decrease the revolution of the output shaft under uniform load condition. It is the reason why, if the magnitude of the force FR is decreased, the rotational force of the low speed power line is increased the output shaft is not affected significantly by the force FR because it is connected both high speed power line and low speed power line, and accordingly the low speed power line is affected relatively to a greater extent. Therefore, the component of the force FR acting on the output shaft is neglected in case where this operation is considered, the revolutions of the low speed power line is increased, and eventually the revolution of the output shaft is decreased.

In the case where the input shaft and the output shaft rotate in uniform velocity and the position adjusting lever (730 in FIG. 11) is placed in proper position to bring the rotational forces of the low speed power line and the high speed power line into balance, if the load is increased, the angle of $\alpha$ which is explained below and in FIG. 4 is increased and the spring force of FS of the adjusting lever 701 exerted on the sun gear 704 is decreased and also the adjusting lever 701 is moved in direction where the spring force is decreased and eventually the rotational resistance of the sun gear 704 is decreased, accordingly the low speed power line rotates more, and that causes the revolution of the output shaft to decrease to comply with the load, then the angle of $\alpha$ is decreased and the adjusting lever 701 returns to the position where the spring force FS increases, then finally the high speed power line and the low speed power line come into balanced condition and become stable.

Next, in this balanced condition, if the rotational force of the input shaft increase, the angle of $\beta$ as in FIG. 4 is generated and the angle of $\alpha$ is decreased, then the force impeding the revolution of the sun gear 704 is increased, and consequently the force FR which acts as the rotational resistance of sun gear 704 and the planetary gear carrier 604 is increased and the low speed power line is decreased in its speed, resulting in the increase in revolution of the high speed power line. Due to the above, the rotational velocity of the load increases and accordingly the angle of $\beta$ decreases bringing about the stabilization at that speed. From this if the position of adjusting lever 730 is placed in such a way that the spring force FS is in opposite direction to the indication shown in FIG. 12A, that is, in the direction of supporting the rotation of the sun gear 704, then the low speed power line is subjected to a continuous force to let the low speed power line rotate more and consequently the output shaft is decreased in its speed to come into stationary condition, if, from the begining, the position adjusting lever is placed in this way, even if there exists the input rotational force, it does not run out of the output shaft. In this case, the rotational force transmitted to the low speed power line flows reversely and turns the high speed power line reversely to form the closed circuit of transmission of the rotational force.

As described here-to-fore, the automatic stepless transmission apparatus provided by the present invention can automatically adjust the ratio of speed variation according to the magnitude of the input and the load making satisfactory speed adjustment possible and has the advantage of capability of satisfactory starting of even the machine requiring large starting torque.

Accordingly, the present invention can be utilized in any apparatus which requires adjustment of the difference in revolutions due to the inconsistency of the revolutions of the prime mover and the load. While above description contains many specificities, these should not be construed as limitations on the scope of the invention, but rather as an exemplification of one preferred embodiment thereof. Many other variations are possible.

TABLE 1

| | Revolutions of each part per a revolution of input shaft | | | | | |
|---|---|---|---|---|---|---|
| | Sun gear of high speed power line | Ring gear of low speed power line | Differential carrier of high speed power line | Sun gear of low speed power line | Output shaft | Adjustment shaft |
| Only high speed power line rotate | $\frac{60 + 20}{20} = 4$ | 0 | $4 \times \frac{1}{2} = 2$ | 0 | $2 \times \frac{60}{30 + 60} = \frac{4}{3}$ | $\frac{4}{3} \times \frac{60}{60 + 20} = 1$ |
| Only low speed power line rotate | 0 | $\frac{60 + 20}{60} = \frac{4}{3}$ | 0 | $\frac{4}{3} \times 2 = \frac{8}{3}$ | $\frac{8}{3} \times \frac{30}{30 + 60} = \frac{8}{9}$ | $\frac{4}{3} \times \frac{20}{60 + 20} + \frac{8}{9} \times \frac{60}{60 + 20} = \frac{1}{3} + \frac{2}{3} = 1$ |
| Neutral | $-8$ | 4 | $-4$ | 8 | 0 | $4 \times \frac{20}{60 + 20} = 1$ |

What is claimed is:

1. An automatic transmission apparatus for an automatic and stepless change in the rotational speed of an output shaft in response to a variation in a load imposed on the output shaft and in further response to a change in rotational input power delivered to an input shaft, comprising:

a load detecting gear set communicating with the input shaft and the output shaft for detecting a change in rotational phase which varies according to a change in rotational power delivered to the input shaft;

said load detecting gear set providing in use rotational output which is rotatably connected to a rotational shaft;

a low speed power line for generating a low gear variation ratio rotational output;

a high speed power line for generating a high gear variation ratio rotational output;

a distribution gear assembly rotatably connected to said rotational shaft for distributing the input rotational power delivered through said load detecting gear set into said low speed power line and said high speed power line;

a reduction gear assembly of said high speed power line rotatably connected to said distribution gear assembly for reducing the rotational speed of said high speed power line and generating a reduced rotational speed output;

an acceleration gear assembly of said low speed power line rotatably connected to said distribution gear assembly for increasing the rotational speed of said low speed power line and generating an increased rotational speed output;

a combination gear assembly rotatably connected thereto for combining said reduced rotational output power of said high speed power line and said increased rotational output power of said low speed power line, and transmitting a combined rotational power to the output shaft;

said combination gear assembly including:
a sun gear rotatably mounted on the output shaft to enable rotation thereof independently of the output shaft and mechanically communicating with said low speed power line to receive rotational force therefrom;
a plurality of planetary gears with each planetary gear mechanically communicating with said sun gear;
a planetary gear carrier for rotatably securing each planetary gear of said plurality of planetary gears to enable mechanical communication of each planetary gear with said sun gear and mechanical communication with the output shaft to transmit rotational force thereto; and
a ring gear mechanically communicating with each planetary gear of said plurality of planetary gears to enable rotation of each planetary gear of said plurality of planetary gears and mechanically communicating with said high speed power line to receive rotational force therefrom, and
a rotational adjustment means rotatably connected to the output shaft, the input shaft and said low speed power line, such that in the rotational force of said low speed power line is brought in balance with the rotational force of said high speed power line by varying the rotational resistance on said low speed power line in response to a difference in phase between the input shaft and the output shaft detected by said load detecting gear set thereby automatically adjusting a variation ratio from 0 to more than 1 to comply with the conditions of the input rotational power and the load imposed on the output shaft.

2. The apparatus of claim 1, wherein said load detecting gear set 100 comprises a gear 103 for receiving said input rotational power from said input shaft;
a plurality of projections 107 with each projection 106 positioned on said gear 103 in a manner to provide an arc space 10 separating adjacent positioned projections;
said rotational shaft 101 including a plurality of projections 108 with each projection 104 positioned on said rotational shaft in a manner to provide an arc space 13 separating adjacent projections to enable said projections of said rotatable shaft to be loosely received into a portion of said arc space 10 of said gear 103 and said projections of said gear to be loosely received into a portion of said arc space 13 thereby forming a common arc space 15 comprising a portion of each said arc space of said gear and said rotational shaft, respectively, to enable partial rotation of said gear 103 about said rotational shaft 101 before said projections 107 of said gear 103 engage said projections 108 of said rotational shaft 101; and
a plurality of springs 109 with each spring 102 of said plurality of springs being positioned in each alternating common arc space such that upon rotation of said load detecting gear by the input shaft, said rotational force provided to said load detecting gear is transmitted through said positioned projections 106 of said load detecting gear to said springs positioned in said common arc space 16 and then to said projections 104 of said rotational shaft 101.

3. The apparatus of claim 1, wherein said distribution gear assembly 200, comprises:
a sun gear 203 rotatably mounted on a stationary shaft "X" to enable in use rotation of said sun gear 203 relative to said stationary shaft;
a plurality of planetary gears 202A with each planetary gear 202 mechanically communicating with said sun gear 203;
a planetary gear carrier 204 for rotatably securing each planetary gear 202 of said plurality of planetary gears 202A to enable mechanical communication of each planetary gear with said sun gear 203;
said planetary gear carrier 204 mechanically communicating with said rotational shaft 101 to receive rotational force therefrom;
a ring gear 201 mechanically communicating with each planetary gear 202 of said plurality of planetary gears 202A to enable rotation of each planetary gear 202 of said plurality of planetary gears 202A to transmit said rotational force to said acceleration gear assembly 400 and said sun gear 203 to transmit said rotational force to said reduction gear assembly 300.

4. The apparatus of claim 1, wherein said rotational adjustment means 800 comprise a first control gear assembly 700 and a second control gear assembly 600;
a ring gear 201 of said low speed power line;
said second control gear assembly 600 comprise:
an adjustment shaft 650 having a first end 650A and a second end 650B with said second end rotatably positioned on said rotational shaft 101 to enable independent rotation relative to said shaft 101 and said first end terminating in a planetary gear carrier 651;
a sun gear 605 rotatably secured to enable rotation around a stationary shaft "X" and mechanically communicating with said ring gear 201 of said low speed power line to influence the rotational force thereto;
a plurality of planetary gears 602A with each planetary gear 602 mechanically communicating with said sun gear 605;
a plurality of gear pins 603A with each planetary gear pin 603 rotatably securing each planetary gear 602 of said plurality of planetary gears and each gear pin having a first end 603B and a second end 603C;
said first end 603B of said gear pin 603 secured to said planetary gear carrier 604 and said second end of said gear pin 603C secured to said planetary gear carrier 651 of said adjustment shaft 650 with a planetary gear 602 rotatably positioned on said gear pin between said planetary gear carrier 604 and said planetary gear carrier of said adjustment shaft 650;
a ring gear 601 mechanically communicating with each planetary gear 602 of said plurality of planetary gears 602A;
said ring gear 601 mechanically communicating with said combination gear assembly 500;
said first control gear assembly 700 comprise:
a ring gear 705 rotatably positioned on said rotational shaft 101 to enable independent rotation relative to said shaft 101;
a plurality of planetary gears 703A with each planetary gear 703 mechanically communicating with said ring gear 705;
said first control gear assembly characterized in that said ring gear 705 enables in use simultaneous mechanical communication with said input shaft 1 to provide rotation of said ring gear 705 upon rotation of said input shaft 1 and mechanical communication with each planetary gear 703 of said plurality of planetary gears 703A to enable rotation of each planetary gear 703 of said plurality of planetary gears 703A, respectively;

a planetary gear carrier 710 for rotatably securing each planetary gear 703 of said plurality of planetary gears 703A to said ring gear 705 to enable mechanical communication with said ring gear;

said planetary gear carrier 651 of said adjustment shaft 650 for rotatably securing each planetary gear 602 of said plurality of planetary gears 602A of said second control gear assembly 600 to said adjustment shaft 650;

a sun gear 704 rotatably communicating with each said planetary gear 703 of said plurality of planetary gears 703A rotatably communicates with said planetary gear carriers 603, 604 of said second control gear assembly through said adjustment shaft 650 mechanically communicating with said second control gear assembly;

a lever 701 for balancing the rotational force of the low speed power line and the high speed power line including a first end 701A and a second end 701B with said second end 701B secured to said planetary gear carrier 710 to enable manipulation of said carrier 710 by laterally displacing said lever;

said lever 701 with said first end 701A being resiliently connected to a casing 22 housing said apparatus by a spring means such that in use said spring means exerts a force on said lever, said carrier 710 and each planetary gear 703 of said plurality of planetary gears 703a initiating an action selected from the group consisting of impeding the rotation of sun gear 704 where said spring force is exerted in a direction opposite to the rotation direction of said sun gear 704 and assisting in the rotation of said ring gear 705 and of assisting the rotation of said sun gear 704 where said spring force is exerted in a direction opposite to the rotation direction of said ring gear 705 and impeding in the rotation of said ring gear 705 and wherein each planetary gear 703 of said plurality of planetary gears 703A further includes a predetermined number of teeth such that in use said planetary gear carrier 710 does not rotate relative to said casing thereby enabling said lever to remain stationary and extend exterior to said casing housing said apparatus.

5. The apparatus of claim 4, further including a lever position setting means comprising a fixing bolt means 735 for limiting the range of the lateral displacement of said lever 701 such that in use a spring force which pushes said lever 701 in a predetermined direction is limited by said bolt means.

6. The apparatus of claim 4, wherein said adjustment shaft 650 is configured around said planetary gear carrier 204 and between said ring gear 201 and said sun gear 203 of the distribution gear assembly.

7. The apparatus of claim 1, further including a sun gear 203 of said distribution gear assembly 200, and wherein said reduction gear assembly 300 comprises:

a sun gear 301 rotatably positioned on a stationary shaft "X" and integrally combined with said sun gear 203 for receiving rotational force from said distribution gear assembly 200;

a plurality of planetary gears 302 mechanically communicating with said sun gear 301;

a sun gear 306 secured to said stationary shaft "X" to prevent the rotation thereof;

a plurality of planetary gears 303 mechanically communicating with said planetary gears 302 and said sun gear 306; and a planetary gear carrier 305 rotatably securing each planetary gear 303 of said plurality of planetary gears 303 such that upon rotation of said sun gear 301, said planetary gear carrier 305 rotates transmitting rotational force from said reduction gear assembly to said combination gear assembly 500.

8. The apparatus of claim 1, wherein said distribution gear assembly further includes a ring gear 201 and said acceleration gear assembly 400 comprises:

a sun gear 406 mechanically communicating with a casing housing the apparatus to prevent rotation of said sun gear 406;

a plurality of planetary gears 403A with each planetary gear 403 mechanically communicating with said sun gear 406;

plurality of planetary gears 402A with each planetary gear 402 mechanically communicating with said planetary gear 403;

a planetary gear carrier 401 rotatably securing each planetary gear 402 of said plurality of planetary gears 402A and each planetary gear 403 of said plurality of planetary gears 403A such that said carrier 401 receives rotational force from said ring gear 201 of said distribution gear assembly 200; and a sun gear 405 mechanically communicating with said planetary gear 402 and said sun gear 405 rotatably combined with said sun gear 502 such that upon rotation of said planetary gear 402, said sun gear 405 receives rotational force from said planetary gear 402 and transmits said rotational force to said sun gear 502 of said combination gear assembly 500.

9. An automatic transmission apparatus for an automatic and stepless change in the rotational speed of an output shaft in response to a variation in a load imposed on the output shaft and in further response to a change in rotational input power delivered to an input shaft, comprising:

a stationary shaft "X" for enabling rotation relative to said shaft;

a load detecting gear set 100 rotatably connected to the input shaft and the output shaft for detecting a change in rotational phase which varies according to a change in the load imposed on the output shaft and to a change in rotational power delivered to the input shaft;

a rotational shaft 101 rotating relative to said stationary shaft "X";

said load detecting gear set 100 providing in use rotational output which is rotatably connected to said rotational shaft;

said load detecting gear 100 comprising a gear 103 for receiving said input rotational power from said input shaft;

a plurality of projections 107 with each projection 106 positioned on said gear in a manner to provide an arc space 10 separating adjacent positioned projections;

said rotational shaft 101 including a plurality of projections 108 with each projection 104 positioned on said rotational shaft in a manner to provide an arc space 12 separating adjacent projections to enable said projections of said rotatable shaft to be loosely received into a portion of said arc space 10 of said gear 103 and said projections of said gear to be loosely received into a portion of said arc space 13 thereby forming a common arc space 15 comprising a portion of each said arc space of said gear and said rotational shaft, respectively, to enable partial rotation of said gear about said rotational shaft before said projections of said gear engage said projections of said rotational shaft;

a plurality of springs 109 with each spring 102 of said plurality of springs being positioned in each alternating common arc space such that upon rotation of said load detecting gear by the input shaft, said rotational force provided to said load detecting gear is transmitted through said positioned projections 106 of said load detecting gear to said springs positioned in said common arc space and then to said projections 104 of said rotational shaft 101;

a low speed power line for generating a low gear variation ratio rotational output;

a high speed power line for generating a high gear variation ratio rotational output;

a high speed power line for generating a high gear variation ratio rotational output;

a distribution gear assembly 200 rotatably connected to said rotational shaft for distributing the input rotational power delivered through said load detecting gear set 100 into said low speed power line and said high speed power line;

a reduction gear assembly 300 of said high speed power line is rotatably connected to said distribution gear assembly for reducing the rotational speed of said high speed power ling and generating a reduced rotational speed output;

said distribution gear assembly 200 comprising a sun gear 203 rotatably mounted on said stationary shaft "X" to enable in use rotation of said sun gear 203 relative to said stationary shaft;

a plurality of planetary gears 202A with each planetary gear 202 mechanically communicating with said sun gear 203;

a planetary gear carrier 204 for rotatably securing each planetary gear 202 of said plurality of planetary gears 202a to enable mechanical communication of each planetary gear with said sun gear 203;

said planetary gear carrier 204 mechanically communicating with said rotational shaft 101 to receive rotational force therefrom;

a ring gear 201 mechanically communicating with each planetary gear 205 of said plurality of planetary gears 205a to enable rotation of each planetary gear of said plurality of planetary gears to transmit said rotational force to said acceleration gear assembly 400 and said sun gear 203 to transmit said rotational force to said reduction gear assembly 300;

an acceleration gear assembly 400 of said low speed power line is rotatably connected to said distribution gear assembly for increasing the rotational speed of said low speed power line and generating an increased rotational speed output;

a combination gear assembly 500 for receiving low speed power line rotational force and high speed line rotational force and for combining said reduced rotational output power of said high speed power line and said increased rotational output power of said low speed power line, and transmitting a combined rotational power to the output shaft;

said combination gear assembly 500 comprising a sun gear 502 rotatably mounted on output shaft 501 to enable rotation independent of the output shaft and mechanically communicating with said low speed power line to receive rotational force therefrom;

a plurality of planetary gears 503A with each planetary gear 503 mechanically communicating with said sun gear 502;

a planetary gear carrier 506 for rotatably securing each planetary gear 503 of said plurality of planetary gears 503A to enable mechanically communication with the output shaft to transmit rotational force thereto;

a ring gear 504 mechanically communicating with each planetary gear 503 of said plurality of planetary gears 503A to enable rotation of each planetary gear of said plurality of planetary gears and mechanically communicating with said high speed power line to receive rotational force therefrom;

a rotational adjustment means 800 rotatably connected to the output shaft, the input shaft and said low speed power line, such that in use said rotational force of said low speed power line is brought in balance with said rotational force of said high speed power line by varying the rotational resistance on said low speed power line in response to a difference in phase between the input shaft and the output shaft detected by said load detecting gear thereby automatically adjusting a variation ratio from 0 to more than 1 to comply with the conditions of the input rotational power and the load imposed on the output shaft;

said rotational adjustment means 800 comprising a first control gear assembly 700 and a second control gear assembly 600;

a ring gear 201 of said low speed power line;

said second control gear assembly 600 comprising:

an adjustment shaft 650 rotatably positioned on said rotational shaft 101 to enable independent rotation relative to said shaft 101 and having a first end and a second end with said first end terminating in a planetary gear carrier;

a sun gear 605 rotatably secured to enable rotation around said stationary shaft "X" and mechanically communicating with said ring gear 201 of said low speed power line influence the rotational force thereto;

a plurality of planetary gears 602A with each planetary gear 602 mechanically communicating with said sun gear 605;

a planetary gear carrier 604 for mechanically securing each planetary gear to enable mechanical communication of each planetary gear with said sun gear 605;

a plurality of gear pins 603A with each planetary gear pin 603 rotatably securing each planetary gear 602 of said plurality of planetary gears and having a first end 603B and a second end 603C;

said first end of said gear pin secured to said planetary gear carrier 604 and said second end of said gear pin secured to said planetary gear carrier 651 of said adjustment shaft 650 with a planetary gear 602 rotatably positioned on said gear pin between said planetary gear carrier 604 and said planetary gear carrier of said adjustment shaft 650;

a ring gear 601 mechanically communicating with each planetary gear 602 of said plurality of planetary gears 602A;

said ring gear 601 mechanically communicating with said combination gear assembly 500;

said first control gear assembly comprising:

a ring gear 705 rotatably positioned on said rotational shaft 101 to enable independent rotation relative to said shaft 101;

a plurality of planetary gears 703A mechanically communicating with said ring gear 705;

said first control gear assembly characterized in that said ring gear 705 enables in use simultaneous mechanical communication with said input shaft 1 to provide rotation of said ring gear 705 upon rotation of said input shaft 1 and mechanical communication with each planetary gear 703 of said plurality of planetary gears 703A to enable rotation of each planetary gear of said plurality of planetary gears 703 relative to said ring gear 705, respectively;

a planetary gear carrier 710 for rotatably securing each planetary gear of said plurality of planetary gears 703 to said ring gear 705 to enable mechanical communication with said ring gear;

said planetary gear carrier 651 of said adjustment shaft 650 for rotatably securing each planetary gear 602 of said plurality of planetary gears 602A of said second control gear assembly 600 to said adjustment shaft 650;

a sun gear 704 rotatably communicating with each said planetary gear 703 of said plurality of planetary gears 703A rotatably communicates with said planetary gear carriers 603, 604 of said second control gear assembly through said adjustment shaft 650 mechanically communicating with said second control gear assembly;

a lever 701 for balancing the rotational force of the low speed power line and the high speed power line including a first end 701A and a second end 701B with said second end 701B secured to said planetary gear carrier 710 to enable manipulation of said carrier 710 by laterally displacing said lever;

said lever 701 with said first end being resiliently connected to a casing housing said apparatus by a spring means such that in use said spring means exerts a force on said lever, said carrier 710 and each planetary gear 703 of said plurality of planetary gear 703 initiating an action selected from the group consisting of impeding the rotation of sun gear 704 where said spring force is exerted in a direction opposite to the rotation direction of said ring gear 705 and impeding in the rotation of said ring gear 705 and wherein each planetary gear 703 of said plurality of planetary gears 703A further includes a predetermined number of teeth such that in use said planetary gear carrier 710 does not rotate relative to said casing thereby enabling said lever to remain stationary and extend exterior to said casing housing said apparatus.

10. The apparatus of claim 9, further including a sun gear 203 of said distribution gear assembly 200, and wherein said reduction gear assembly 300 comprises:

a sun gear 301 rotatably positioned on a stationary shaft "X" and integrally combined with said sun gear 203 for receiving rotational force from said distribution gear assembly 200;

a plurality of planetary gears 302 mechanically communicating with said sun gear 301;

a sun gear 306 secured to said stationary shaft "X" to prevent the rotation thereof;

a plurality of planetary gears 303 mechanically communicating with said planetary gears 302 and said sun gear 306; and a planetary gear carrier 305 rotatably securing each planetary gear 303 of said plurality of planetary gears 303 such that upon rotation of said sun gear 301, said planetary gear carrier 305 rotates transmitting rotational force from said reduction gear assembly to said combination gear assembly 500.

11. The apparatus of claim 9, wherein said distribution gear assembly further includes a ring bear 201 and said acceleration gear assembly 400 comprises:

a sun gear 406 mechanically communicating with a casing housing the apparatus to prevent rotation of said sun gear 406;

plurality of planetary gears 403A with each planetary gear 403 mechanically communicating with said sun gear 406;

a planetary gear carrier 401 rotatably securing each planetary gear 402 of said plurality of planetary gears 402A and each planetary gear 403 of said plurality of planetary gears 403A such that said carrier receives rotational force from said ring gear 201 of said distribution gear assembly; and a sun gear 405 mechanically communicating with said planetary gear 402 and said sun gear 405 rotatably combined with said sun gear 502 such that upon rotation of said planetary gear 402, said sun gear 405 receives rotational force from said planetary gear 402 and transmits said rotational force to said sun gear 502 of said combination gear assembly 500.

* * * * *